(12) United States Patent
Chen

(10) Patent No.: US 8,016,522 B2
(45) Date of Patent: Sep. 13, 2011

(54) HEAT SINK FOR DRILL BITS OF DIFFERENT SIZES

(76) Inventor: Lung-Chih Chen, Tanzih Township, Taichung County (TW)

( * ) Notice: Subject to any disclaimer, the term of this patent is extended or adjusted under 35 U.S.C. 154(b) by 403 days.

(21) Appl. No.: 12/405,444

(22) Filed: Mar. 17, 2009

(65) Prior Publication Data

US 2010/0236753 A1   Sep. 23, 2010

(51) Int. Cl.
*B23B 47/28* (2006.01)
(52) U.S. Cl. .................. 408/56; 408/76; 408/115 R
(58) Field of Classification Search .............. 408/56, 408/61, 67, 76, 72 B, 115 R, 115 B, 241 G; B23B 47/28, 49/00, 49/02, 51/06
See application file for complete search history.

(56) References Cited

U.S. PATENT DOCUMENTS

| | | | | |
|---|---|---|---|---|
| 889,273 A | * | 6/1908 | Thomas | 408/16 |
| 1,073,362 A | * | 9/1913 | Redeker | 408/83.5 |
| 2,847,880 A | * | 8/1958 | Neidig | 408/59 |
| 3,062,076 A | * | 11/1962 | Craig | 408/105 |
| 3,097,891 A | * | 7/1963 | Brideau | 384/31 |
| 5,333,973 A | * | 8/1994 | Hoshino et al. | 408/56 |

FOREIGN PATENT DOCUMENTS

| | | | |
|---|---|---|---|
| EP | 2228158 A2 | * | 9/2010 |
| FR | 2924959 A1 | * | 6/2009 |
| GB | 2444240 A | * | 6/2008 |
| GB | 2450529 A | * | 12/2008 |

* cited by examiner

*Primary Examiner* — Daniel Howell
(74) *Attorney, Agent, or Firm* — Alan Kamrath; Kamrath & Associates PA (57) ABSTRACT

A heat sink for a drill press includes a main body having a receiving chamber which has a top provided with a limit tube, a guide unit mounted on the main body, and a sponge mounted in the main body. The guide unit includes an outer tube mounted on the receiving chamber and protruding from the limit tube, a plurality of inner tubes laminating each other and mounted in the outer tube, and a positioning tube mounted between the limit tube and the outer tube and abutting the inner tubes to position the inner tubes in the outer tube. Thus, the guide unit has an adjustable size by provision of the inner tubes and the outer tube so as to fit drill bits of different sizes and specifications, thereby enhancing the versatility of the heat sink.

20 Claims, 8 Drawing Sheets

HEAT SINK FOR DRILL BITS OF DIFFERENT SIZES

BACKGROUND OF THE INVENTION

1. Field of the Invention

The present invention relates to a heat sink and, more particularly, to a heat sink for the drill bit of a drill press.

2. Description of the Related Art

Figure 6:
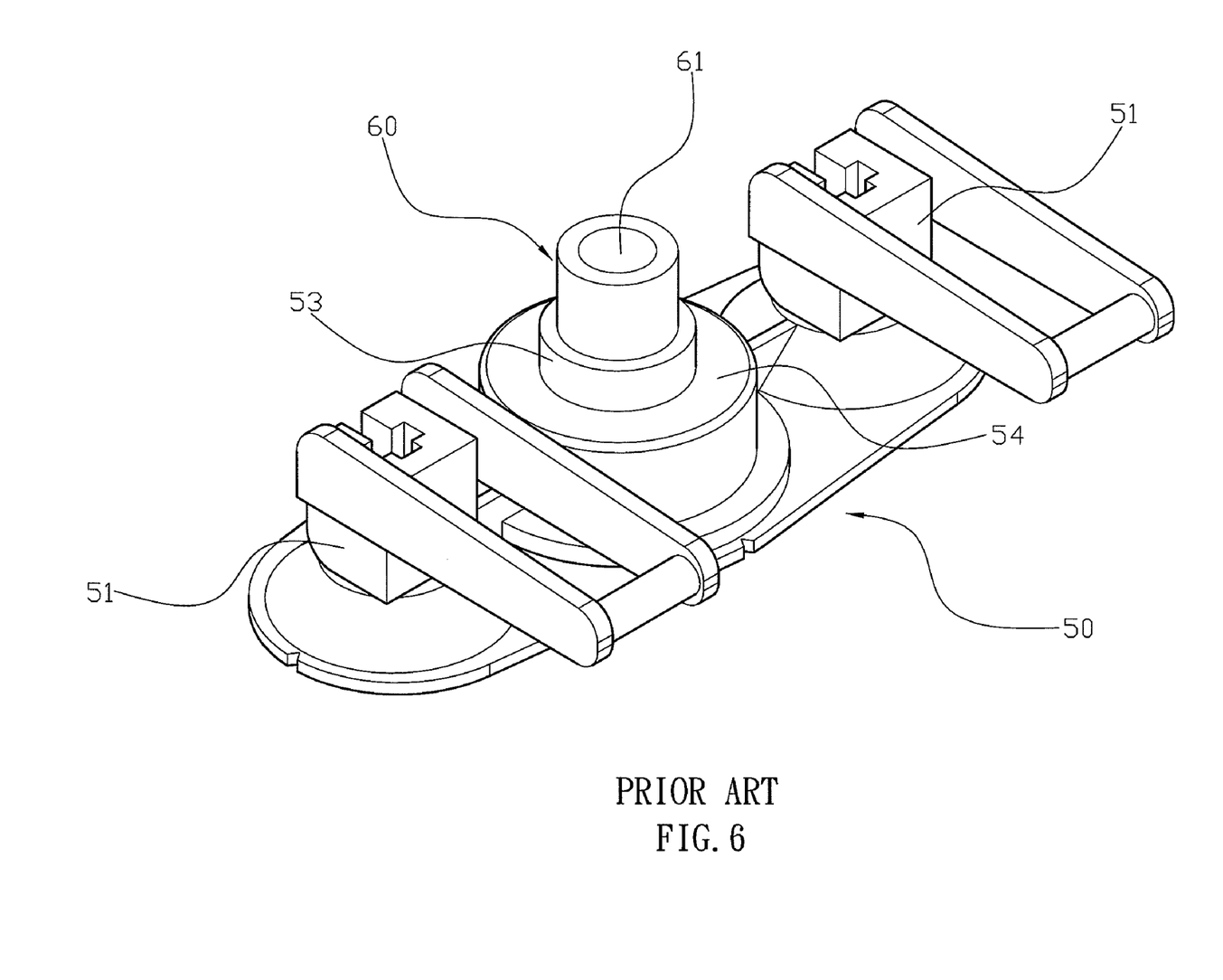
FIG. 6 is a perspective view of a conventional heat sink for a drill press in accordance with the prior art.
Figure 7:
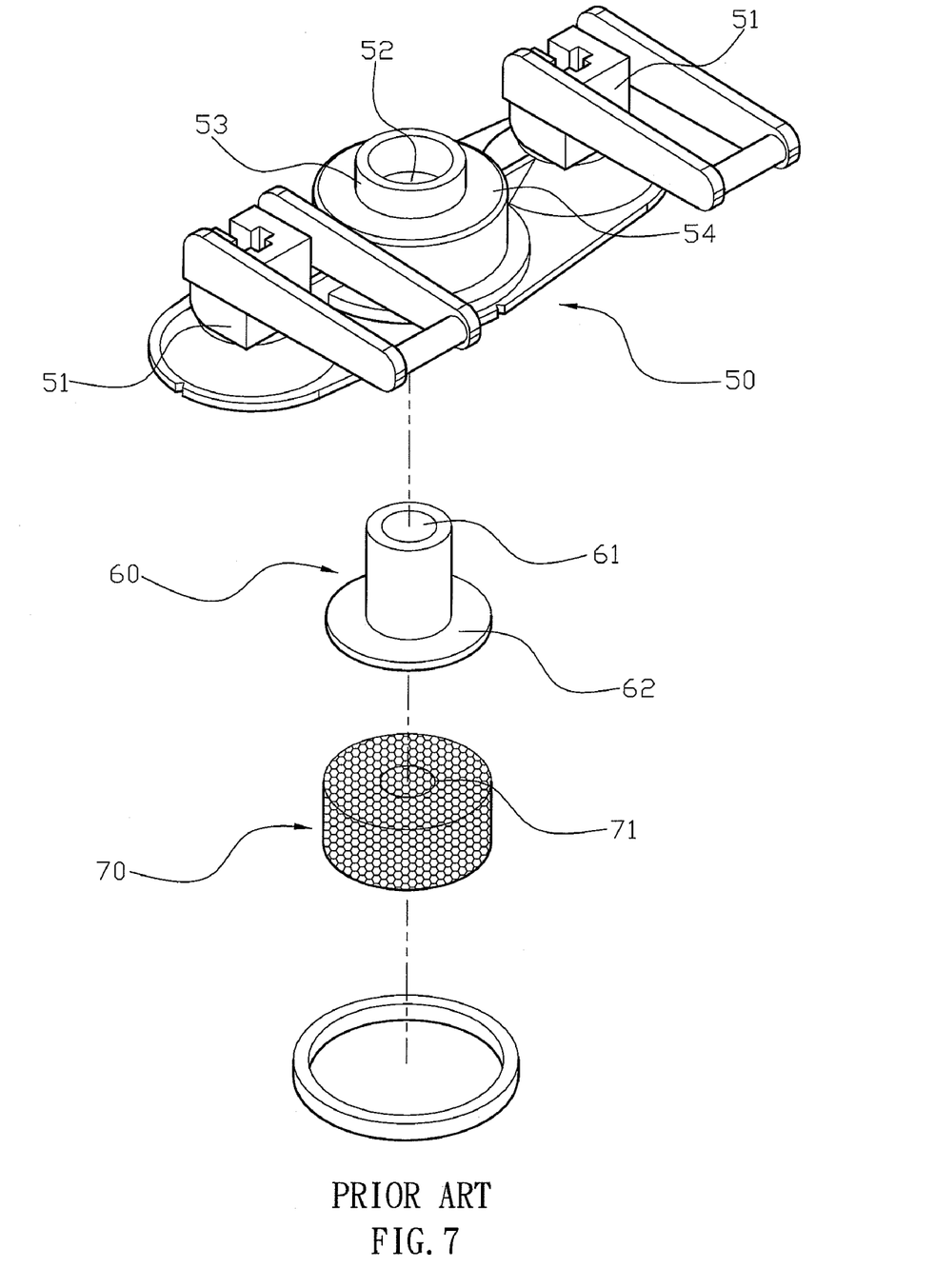
FIG. 7 is an exploded perspective view of the conventional heat sink for a drill press as shown in FIG. 6.
Figure 8:
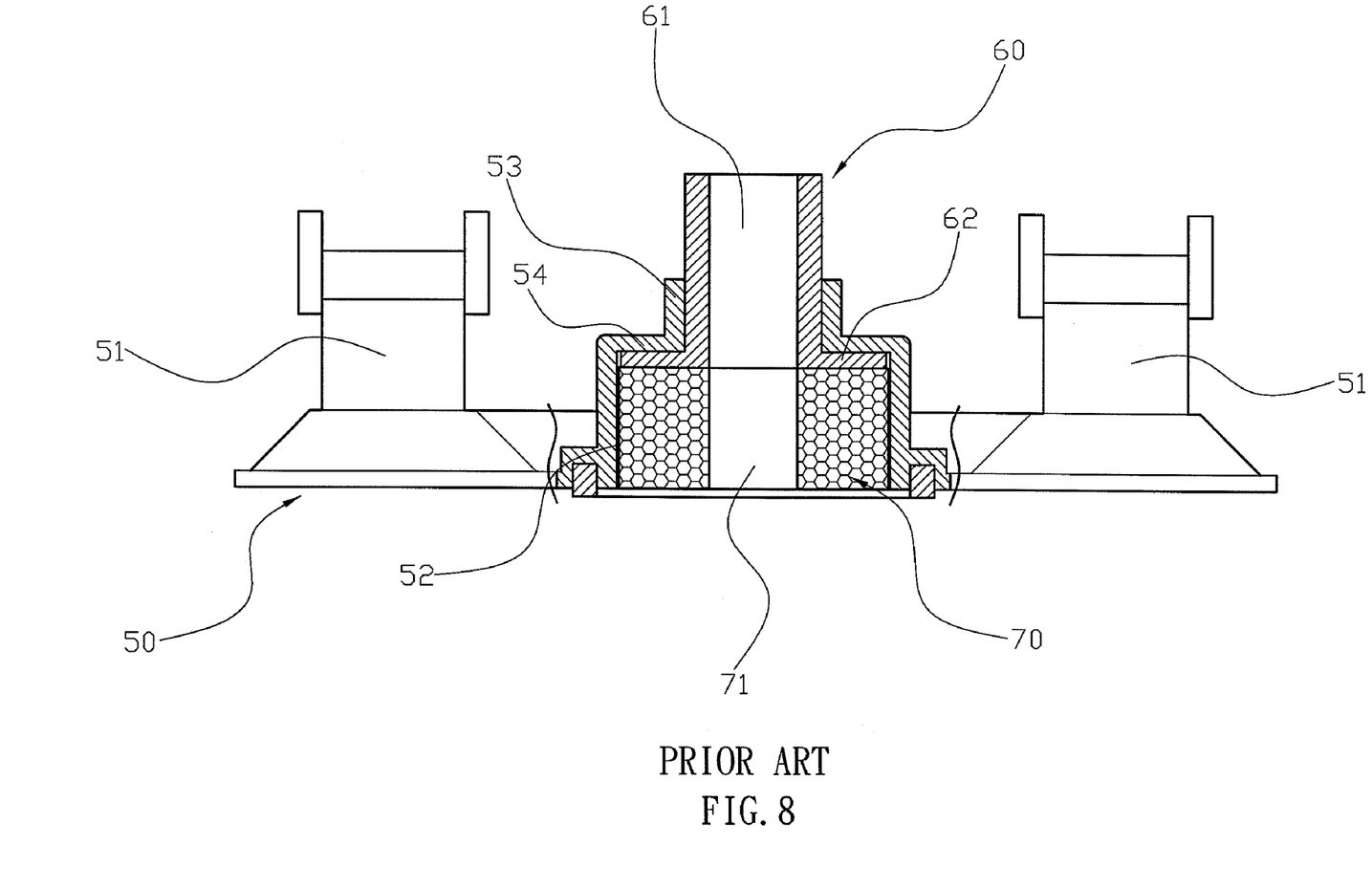
FIG. 8 is a front cross-sectional view of the conventional heat sink for a drill press as shown in FIG. 6.

A conventional heat sink for a drill press in accordance with the prior art shown in FIGS. 6-8 comprises a main body 50, a guide tube 60 mounted on the main body 50, and a sponge 70 mounted in the main body 50. The main body 50 has an inner portion provided with a receiving chamber 52 which has a top provided with a protruding limit tube 53. The limit tube 53 of the main body 50 has a size smaller than that of the receiving chamber 52 of the main body 50. The main body 50 is provided with two suckers 51 to attach the main body 50 to a working surface (not shown). The main body 50 has a mediate portion provided with a shoulder 54 defined between the receiving chamber 52 and the limit tube 53. The guide tube 60 is mounted on the receiving chamber 52 of the main body 50 and protrudes outwardly from the limit tube 53 of the main body 50. The guide tube 60 has an inner portion provided with a guide hole 61 and has a lower end provided with an enlarged stop flange 62 received in the receiving chamber 52 of the main body 50 and abutting the shoulder 54 of the main body 50. The sponge 70 abuts the bottom of the stop flange 62 of the guide tube 60 and received in the receiving chamber 52 of the main body 50. The sponge 70 contains a cooling agent (not shown) therein. The sponge 70 has an inner portion provided with a through hole 71.

In operation, the limit tube 53 of the main body 50 aligns with a predetermined position of a working surface (not shown). Then, the main body 50 is attached to the working surface by the suckers 51. Then, the drill bit of a drill press in turn passes through the guide hole 61 of the guide tube 60 and the through hole 71 of the sponge 70 and is inserted into the working surface to drill a hole in the working surface. At this time, the cooling agent contained in the sponge 70 is released to a periphery of the drill bit to provide a heatsink effect to the drill bit so as to decrease the high temperature produced on the drill bit during the drilling process.

However, the guide hole 61 of the guide tube 60 is only available for the drill bit of a single size and cannot be used to fit drill bits of different sizes, thereby decreasing the versatility of the heat sink. In addition, a user has to prepare multiple heat sinks for drill bits of different sizes, thereby increasing the cost of fabrication.

BRIEF SUMMARY OF THE INVENTION

In accordance with the present invention, there is provided a heat sink for a drill press, comprising a main body having an inner portion provided with a receiving chamber which has a top provided with a protruding limit tube, a guide unit mounted on the main body, and a sponge mounted in the main body. The guide unit includes an outer tube mounted on the receiving chamber of the main body and protruding outwardly from the limit tube of the main body, a plurality of inner tubes detachably laminating each other and adjustably mounted in the outer tube, and a positioning tube mounted between the limit tube of the main body and the outer tube and abutting the inner tubes to position the inner tubes in the outer tube.

The primary objective of the present invention is to provide a heat sink that is available for drill bits of different sizes.

Another objective of the present invention is to provide a heat sink for a drill press, wherein the guide unit has an adjustable size by provision of the inner tubes and the outer tube of the guide unit so as to fit drill bits of different sizes and specifications, thereby enhancing the versatility of the heat sink for a drill press.

A further objective of the present invention is to provide a heat sink for a drill press, wherein the heat sink is available for drill bits of different sizes and specifications, so that a user needs not to buy multiple heat sinks for drill bits of different types, thereby decreasing the cost of the heat sink.

A further objective of the present invention is to provide a heat sink for a drill press, wherein the gasket is used to seal the receiving chamber of the main body so as to prevent the cooling agent in the sponge from permeating outwardly from the receiving chamber of the main body.

Further benefits and advantages of the present invention will become apparent after a careful reading of the detailed description with appropriate reference to the accompanying drawings.

DETAILED DESCRIPTION OF THE INVENTION

Figure 1:
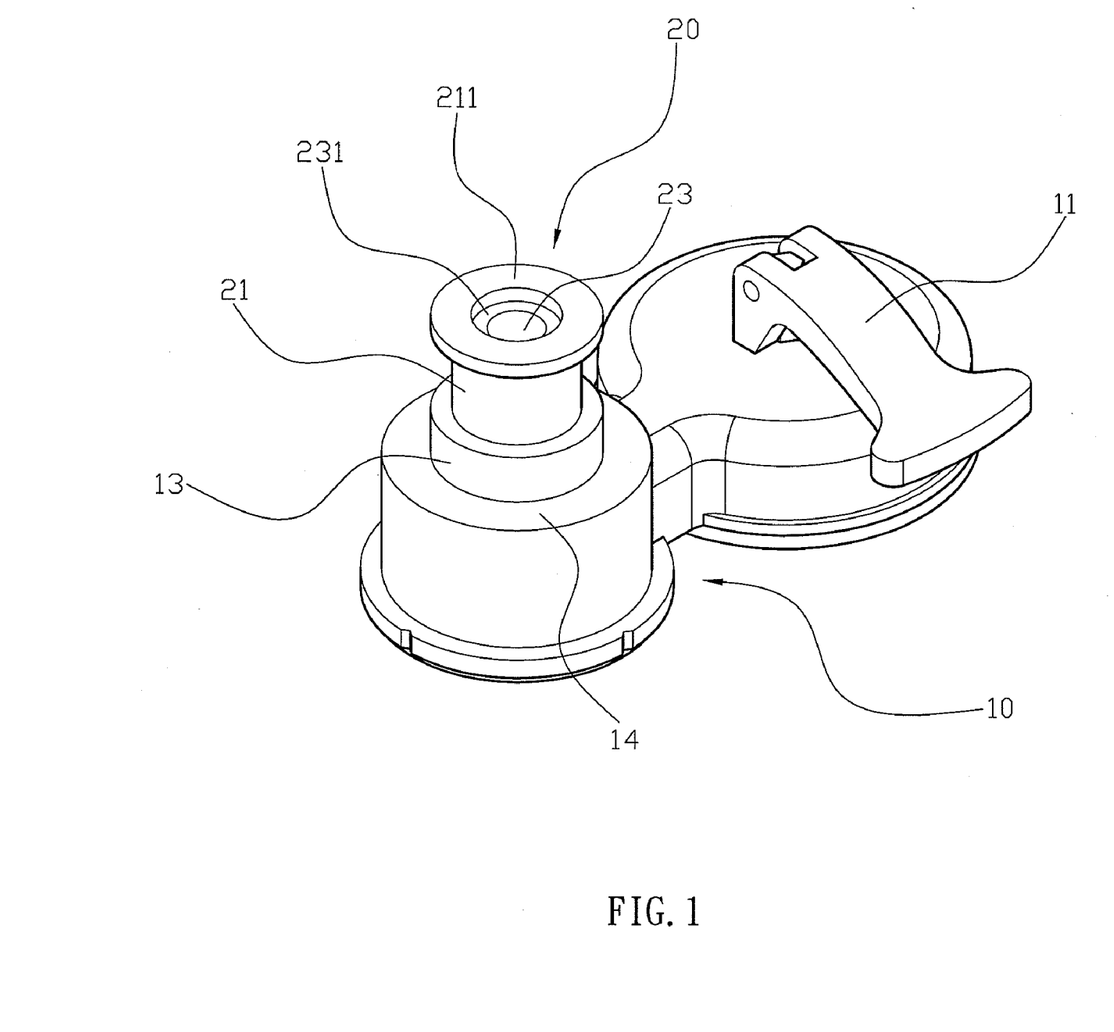
FIG. 1 is a perspective view of a heat sink for a drill press in accordance with the preferred embodiment of the present invention.
Figure 2:
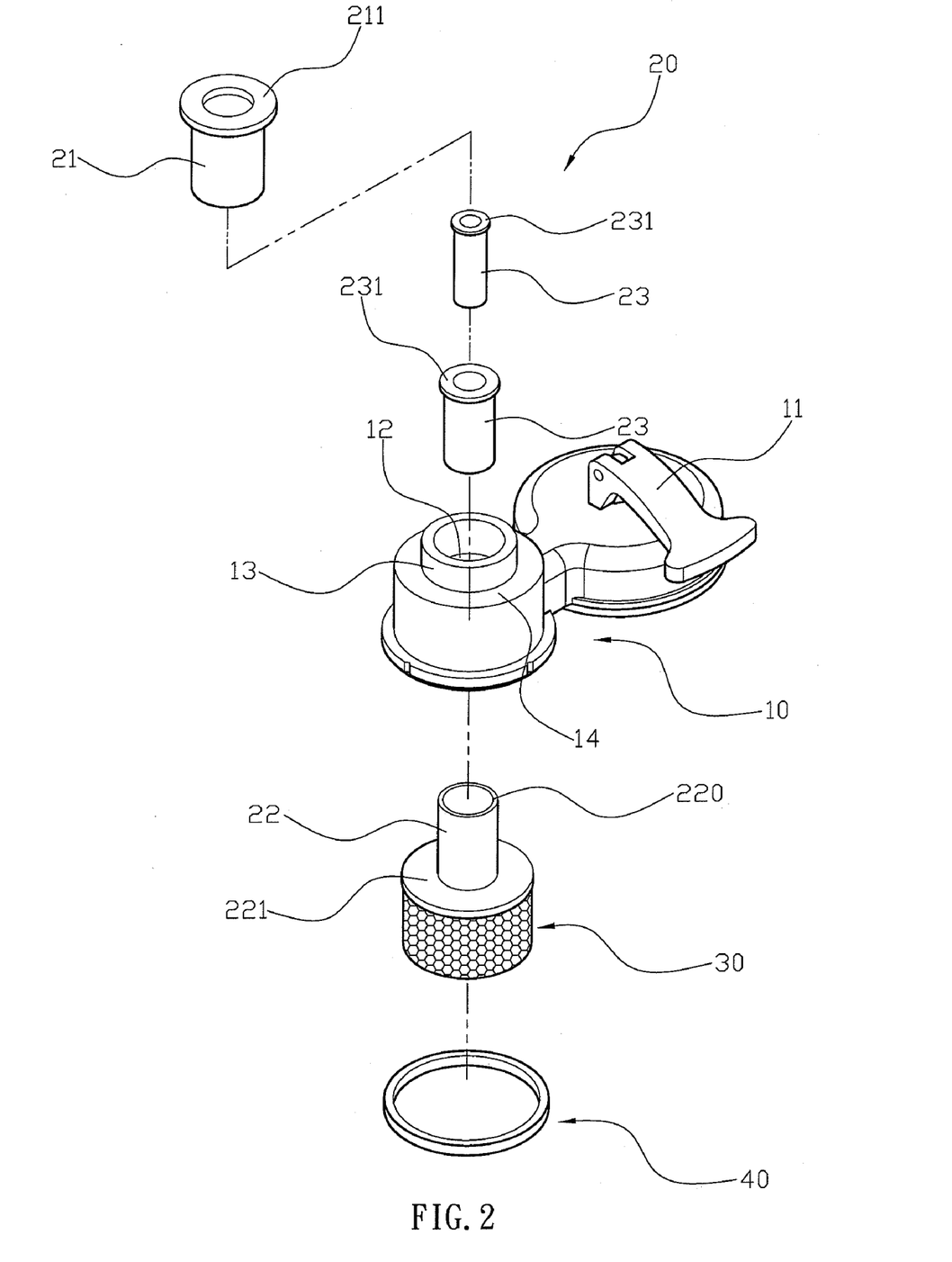
FIG. 2 is an exploded perspective view of the heat sink for a drill press as shown in FIG. 1.
Figure 3:
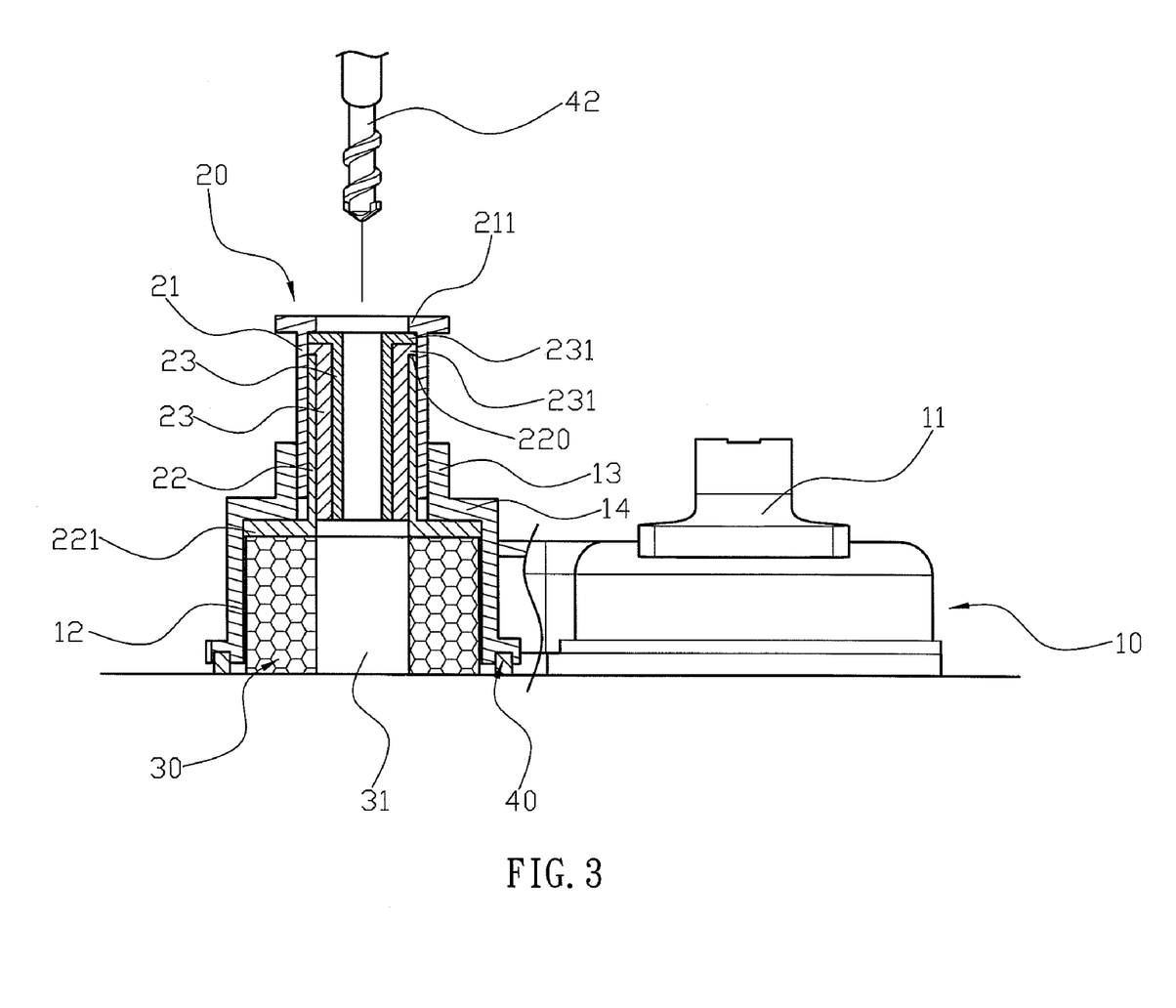
FIG. 3 is a front cross-sectional view of the heat sink for a drill press as shown in FIG. 1.

Referring to the drawings and initially to FIGS. 1-3, a heat sink for a drill press in accordance with the preferred embodiment of the present invention comprises a main body 10, a guide unit 20 mounted on the main body 10, and a sponge 30 mounted in the main body 10.

The main body 10 has an inner portion provided with a receiving chamber 12 which has a top provided with a protruding limit tube 13. The limit tube 13 of the main body 10 has a size smaller than that of the receiving chamber 12 of the main body 10. The main body 10 has a side provided with a sucker 11 to attach the main body 10 to a working surface (not shown). The main body 10 has a mediate portion provided with a shoulder 14 defined between the receiving chamber 12 and the limit tube 13.

The guide unit 20 includes an outer tube 22 mounted on the receiving chamber 12 of the main body 10 and protruding outwardly from the limit tube 13 of the main body 10, a plurality of inner tubes 23 detachably laminating each other and adjustably mounted in the outer tube 22, and a positioning tube 21 mounted between the limit tube 13 of the main body 10 and the outer tube 22 and abutting the inner tubes 23 to position the inner tubes 23 in the outer tube 22.

The outer tube 22 of the guide unit 20 has a lower end provided with an enlarged stop flange 221 received in the receiving chamber 12 of the main body 10 and abutting the shoulder 14 of the main body 10. The stop flange 221 of the outer tube 22 extends radially and outwardly from the outer wall of the outer tube 22. The outer tube 22 of the guide unit 20 has a diameter greater than that of each of the inner tubes 23 of the guide unit 20 and smaller than that of the positioning tube 21 of the guide unit 20. The outer tube 22 of the guide unit 20 is located between the positioning tube 21 and the outermost one of the inner tubes 23. The outer tube 22 of the guide unit 20 abuts the inner wall of the positioning tube 21.

Each of the inner tubes 23 of the guide unit 20 has a different diameter. Each of the inner tubes 23 of the guide unit 20 has an upper end provided with an enlarged resting flange 231. The resting flange 231 of the outermost one of the inner tubes 23 abuts an upper end 220 of the outer tube 22. The resting flanges 231 of the inner tubes 23 detachably laminating each other. The resting flange 231 of each of the inner tubes 23 extends radially and outwardly from the outer wall of each of the inner tubes 23. The resting flange 231 of each of the inner tubes 23 abuts the inner wall of the positioning tube 21. The outermost one of the inner tubes 23 abuts the inner wall of the outer tube 22.

The positioning tube 21 of the guide unit 20 has an upper end provided with an enlarged limit flange 211 abutting the resting flange 231 of the innermost one of the inner tubes 23. The limit flange 211 of the positioning tube 21 extends radially and inwardly from the inner wall of the positioning tube 21. Thus, the resting flanges 231 of the inner tubes 23 are located between the limit flange 211 of the positioning tube 21 and the upper end 220 of the outer tube 22. The positioning tube 21 of the guide unit 20 protrudes outwardly from the limit tube 13 of the main body 10.

The sponge 30 is fixedly mounted on a bottom of the stop flange 221 of the outer tube 22 and received in the receiving chamber 12 of the main body 10. The sponge 30 contains a cooling agent (not shown) therein. The sponge 30 has an inner portion provided with a through hole 31.

The heat sink further comprises a gasket 40 mounted on a bottom of the main body 10 and enclosed around a bottom of the receiving chamber 12. The gasket 40 has a ring shape and has a bottom flush with a bottom of the sponge 30.

Figure 4:
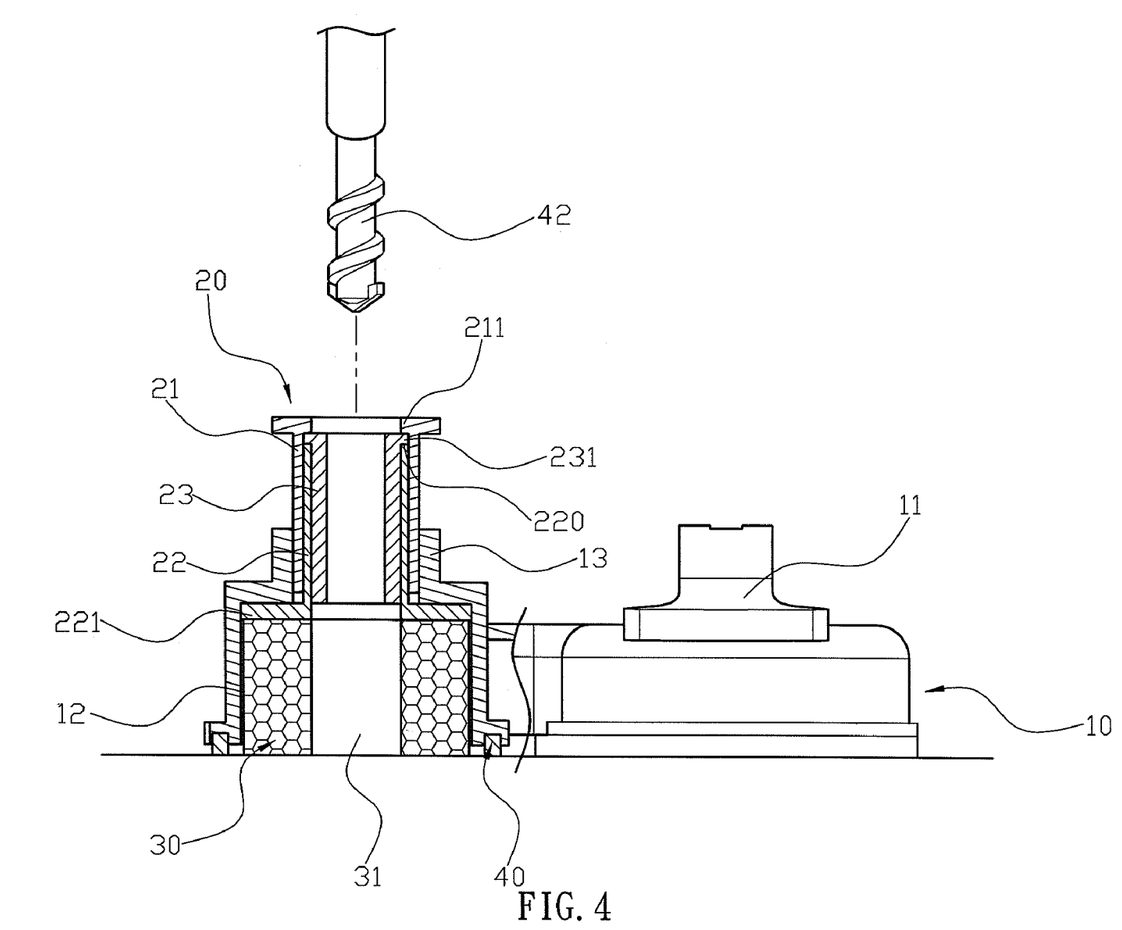
FIG. 4 is a schematic operational view of the heat sink for a drill press as shown in FIG. 3.
Figure 5:
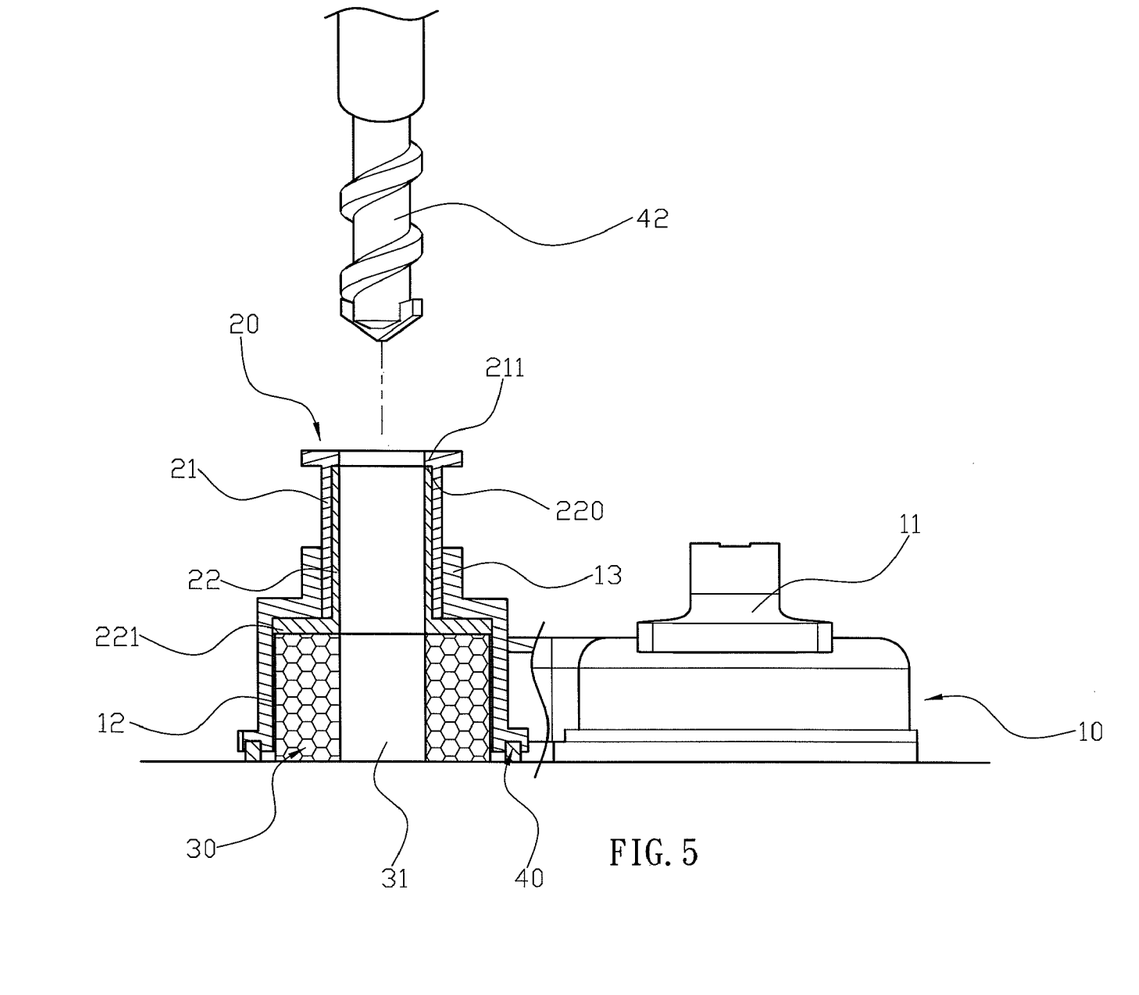
FIG. 5 is a schematic operational view of the heat sink for a drill press as shown in FIG. 4.

In operation, referring to FIGS. 3-5 with reference to FIGS. 1 and 2, the limit tube 13 of the main body 10 aligns with a predetermined position of a working surface (not shown). Then, the main body 10 is attached to the working surface by the sucker 11. Then, the drill bit 42 of a drill press in turn passes through the guide unit 20 and the through hole 31 of the sponge 30 and is inserted into the working surface to drill a hole in the working surface. At this time, the cooling agent contained in the sponge 30 is released to a periphery of the drill bit 42 to provide a heatsink effect to the drill bit 42 so as to decrease the high temperature produced on the drill bit 42 during the drilling process.

As shown in FIG. 3, the drill bit 42 passes through one of the inner tubes 23 of the guide unit 20 having a smaller diameter.

As shown in FIG. 4, the drill bit 42 passes through another one of the inner tubes 23 of the guide unit 20 having a middle diameter.

As shown in FIG. 5, the drill bit 42 passes through the outer tube 22 of the guide unit 20 having a greater diameter.

In such a manner, the guide unit 20 has an adjustable size to fit drill bits 42 of different sizes and specifications. In addition, the gasket 40 is used to seal the receiving chamber 12 of the main body 10 to prevent the cooling agent contained in the sponge 30 from permeating outwardly from the receiving chamber 12 of the main body 10.

Accordingly, the guide unit 20 has an adjustable size by provision of the inner tubes 23 and the outer tube 22 of the guide unit 20 so as to fit drill bits 42 of different sizes and specifications, thereby enhancing the versatility of the heat sink for a drill press. In addition, the heat sink is available for drill bits of different sizes and specifications, so that a user needs not to buy multiple heat sinks for drill bits of different types, thereby decreasing the cost of the heat sink. Further, the gasket 40 is used to seal the receiving chamber 12 of the main body 10 so as to prevent the cooling agent in the sponge 30 from permeating outwardly from the receiving chamber 12 of the main body 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A heat sink for a drill press, comprising:
   a main body having an inner portion provided with a receiving chamber which has a top provided with a protruding limit tube;
   a guide unit mounted on the main body;
   a sponge mounted in the main body;
   wherein the guide unit includes:
   an outer tube mounted on the receiving chamber of the main body and protruding outwardly from the limit tube of the main body;
   a plurality of inner tubes detachably laminating each other and adjustably mounted in the outer tube;
   a positioning tube mounted between the limit tube of the main body and the outer tube and abutting the inner tubes to position the inner tubes in the outer tube.

2. The heat sink for a drill press of claim 1, wherein
   the main body has a mediate portion provided with a shoulder defined between the receiving chamber and the limit tube;
   the outer tube of the guide unit has a lower end provided with an enlarged stop flange received in the receiving chamber of the main body and abutting the shoulder of the main body.

3. The heat sink for a drill press of claim 2, wherein
   each of the inner tubes of the guide unit has an upper end provided with an enlarged resting flange;
   the resting flange of the outermost one of the inner tubes abuts an upper end of the outer tube.

4. The heat sink for a drill press of claim 3, wherein the resting flange of each of the inner tubes abuts the inner wall of the positioning tube.

5. The heat sink for a drill press of claim 3, wherein the positioning tube of the guide unit has an upper end provided with an enlarged limit flange abutting the resting flange of the innermost one of the inner tubes.

6. The heat sink for a drill press of claim 1, wherein
   the sponge is fixedly mounted on a bottom of the stop flange of the outer tube;
   the sponge is received in the receiving chamber of the main body.

7. The heat sink for a drill press of claim 1, further comprising:
   a gasket mounted on a bottom of the main body and enclosed around a bottom of the receiving chamber.

8. The heat sink for a drill press of claim 7, wherein the gasket has a ring shape.

9. The heat sink for a drill press of claim 7, wherein the gasket has a bottom flush with a bottom of the sponge.

10. The heat sink for a drill press of claim 2, wherein the stop flange of the outer tube extends radially and outwardly from the outer wall of the outer tube.

11. The heat sink for a drill press of claim 1, wherein the outer tube of the guide unit has a diameter greater than that of each of the inner tubes of the guide unit and smaller than that of the positioning tube of the guide unit.

12. The heat sink for a drill press of claim 1, wherein the outer tube of the guide unit is located between the positioning tube and the outermost one of the inner tubes.

13. The heat sink for a drill press of claim 1, wherein the outer tube of the guide unit abuts the inner wall of the positioning tube.

14. The heat sink for a drill press of claim 1, wherein each of the inner tubes of the guide unit has a different diameter.

15. The heat sink for a drill press of claim 3, wherein the resting flanges of the inner tubes detachably laminating each other.

16. The heat sink for a drill press of claim 1, wherein the resting flange of each of the inner tubes extends radially and outwardly from the outer wall of each of the inner tubes.

17. The heat sink for a drill press of claim 1, wherein the outermost one of the inner tubes abuts the inner wall of the outer tube.

18. The heat sink for a drill press of claim 5, wherein the limit flange of the positioning tube extends radially and inwardly from the inner wall of the positioning tube.

19. The heat sink for a drill press of claim 3, wherein the resting flanges of the inner tubes are located between the limit flange of the positioning tube and the upper end of the outer tube.

20. The heat sink for a drill press of claim 1, wherein the positioning tube of the guide unit protrudes outwardly from the limit tube of the main body.

* * * * *